United States Patent
Meyberg Guzman et al.

(10) Patent No.: US 10,477,000 B2
(45) Date of Patent: Nov. 12, 2019

(54) HEADSET WITH MAGNETIC FRICTIONAL COUPLER

(71) Applicant: Plantronics, Inc., Santa Cruz, CA (US)

(72) Inventors: Jacob T. Meyberg Guzman, Santa Cruz, CA (US); Barry J. Lee, Santa Cruz, CA (US); John A. Kelley, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/130,889

(22) Filed: Sep. 13, 2018

(65) Prior Publication Data

US 2019/0014202 A1    Jan. 10, 2019

Related U.S. Application Data

(63) Continuation of application No. 15/435,124, filed on Feb. 16, 2017, now Pat. No. 10,104,212.

(51) Int. Cl.
*H04M 1/05* (2006.01)
*H04R 1/10* (2006.01)
*H04M 1/60* (2006.01)

(52) U.S. Cl.
CPC .............. *H04M 1/05* (2013.01); *H04R 1/105* (2013.01); *H04R 1/1008* (2013.01); *H04R 1/1041* (2013.01); *H04R 1/1066* (2013.01); *H04M 1/6058* (2013.01)

(58) Field of Classification Search
CPC .... H04M 1/05; H04M 1/6058; H04R 1/1008; H04R 1/105; H04R 1/1041; H04R 1/1066; H04R 1/1075; H04R 1/1058; H04R 5/033; H04R 5/0335; H04R 2201/10; H04R 2201/105; H04R 2201/107

USPC .................. 381/122, 367, 376, 370, 375
See application file for complete search history.

(56) References Cited

U.S. PATENT DOCUMENTS

| | | | |
|---|---|---|---|
| 8,174,347 B2 | 5/2012 | Fullerton et al. | |
| 8,179,219 B2 | 5/2012 | Fullerton et al. | |
| 9,437,969 B2 | 9/2016 | Witter et al. | |
| 2012/0319808 A1* | 12/2012 | Fullerton | H01F 7/0284 335/306 |
| 2013/0051599 A1 | 2/2013 | Console | |

(Continued)

OTHER PUBLICATIONS

Unknown, "Polymagnet Smart Magnets for Smart Product Design," Polymagnet Flyer, Correlated Magnetics Research, 2015 (1 page).

*Primary Examiner* — Khai N. Nguyen
*Assistant Examiner* — Sabrina Diaz
(74) *Attorney, Agent, or Firm* — Haynes Beffel & Wolfeld LLP

(57) ABSTRACT

A headset is described that utilizes magnetic frictional couplers. A coupler includes a first member having a first engagement surface and a second member having a second engagement surface disposed for relative positioning of the first and second members along a line of adjustment. One or more magnetic elements are arranged on the first and second members to establish a magnetic flux between the first engagement surface and the second engagement surface, and thereby establishing a frictional force tending to hold the relative positions of the first and second members. The magnetic flux varies as a function of relative position of the first and second members along the line of adjustment, and has peaks at a plurality of detent positions along the line of adjustment.

17 Claims, 8 Drawing Sheets

(56) References Cited

U.S. PATENT DOCUMENTS

2015/0063623 A1* 3/2015 Yoshida .................. H04R 1/10
                                                       381/378
2018/0213313 A1* 7/2018 Andrikowich ......... H04R 1/083

* cited by examiner

Relative Angle θ

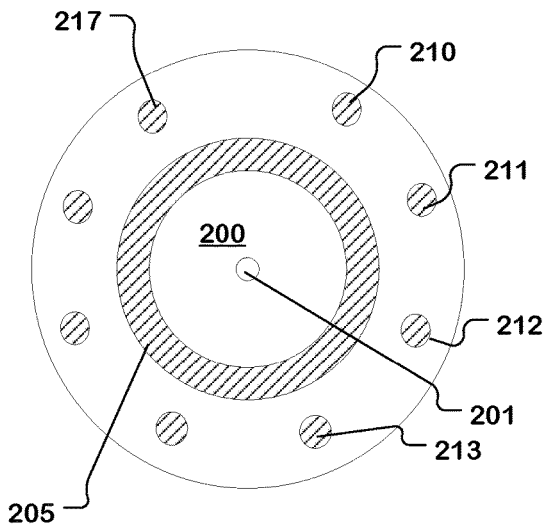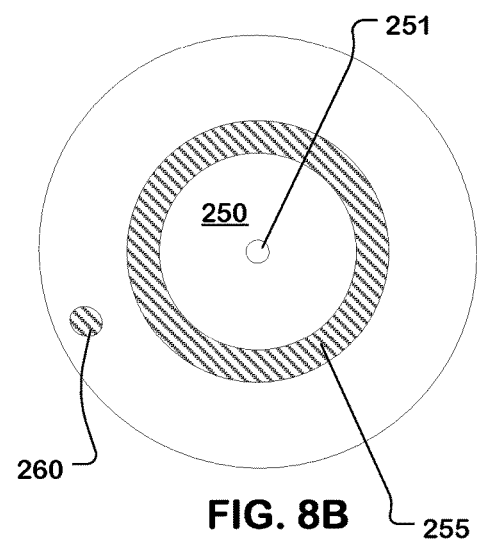
FIG. 8A  FIG. 8B
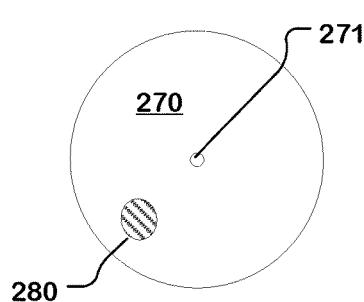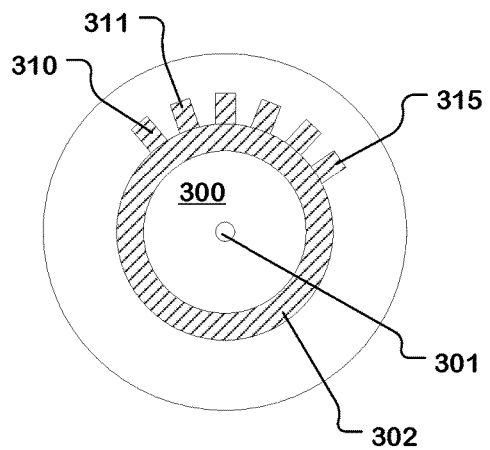
FIG. 9  FIG. 10

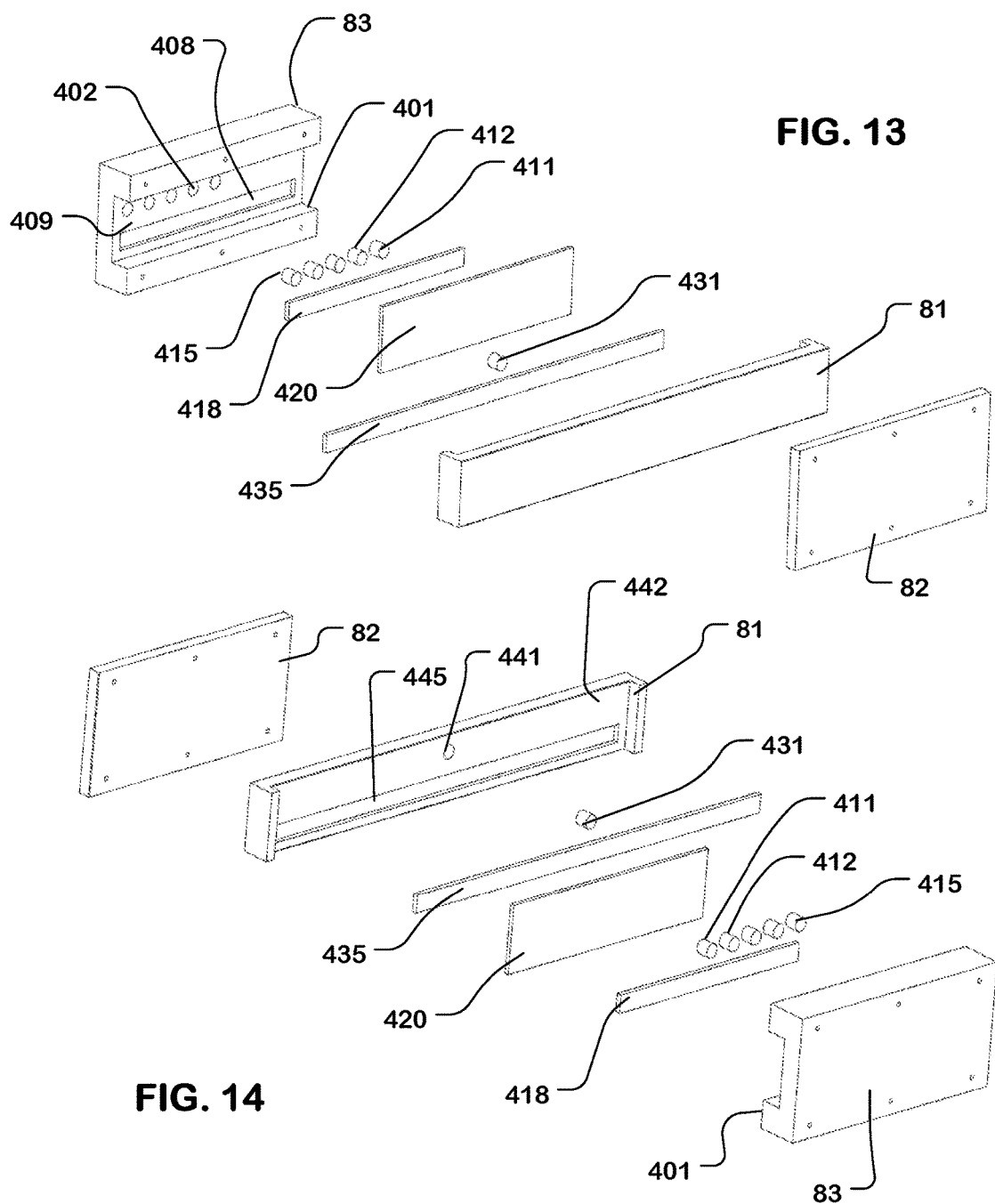

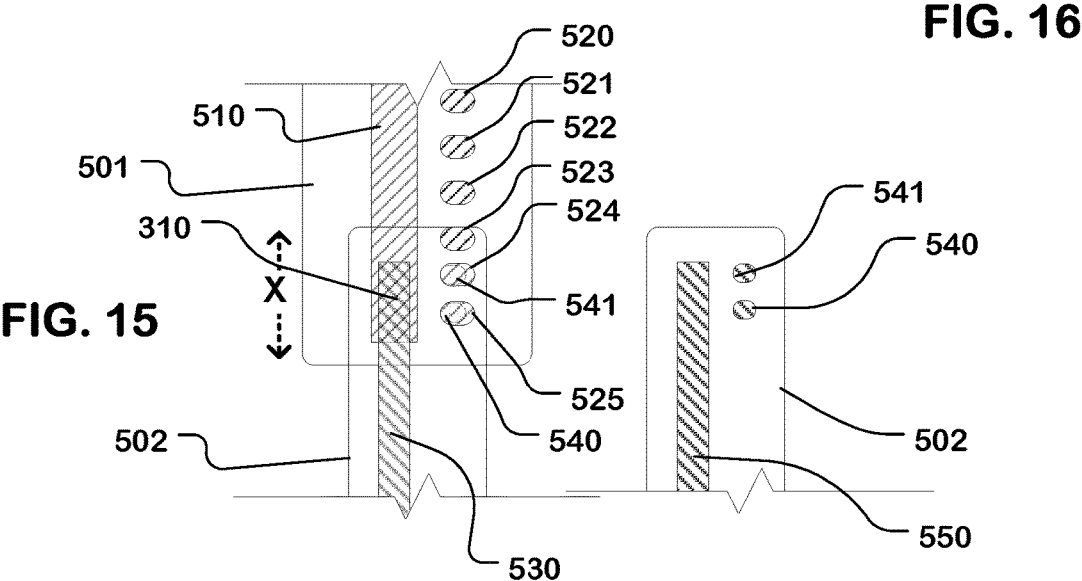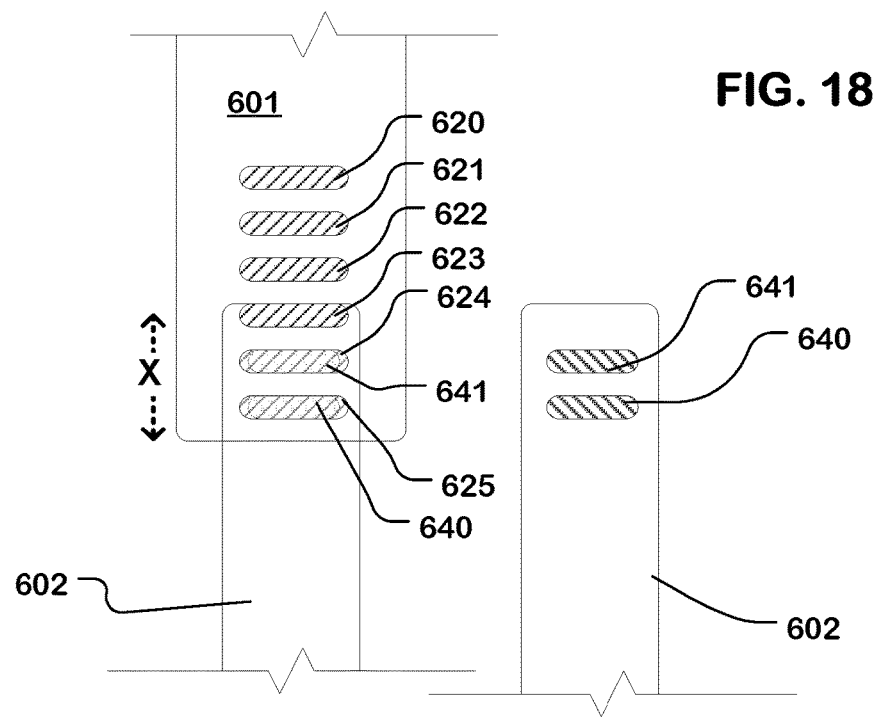

HEADSET WITH MAGNETIC FRICTIONAL COUPLER

RELATED APPLICATIONS

This application is a continuation of U.S. patent application Ser. No. 15/435,124, filed 16 Feb. 2017; which application is incorporated herein by reference.

BACKGROUND OF THE INVENTION

Field of the Invention

The present invention relates to frictional couplers for headsets with a rotating boom for positioning a microphone or other component, and/or an adjustable headband allowing for adjusting the fit of the headset.

Description of Related Art

Headsets are used in a variety of environments. For example, headsets are used in call centers so that the telephone operators can conduct conversations with their hands free. Many types of headsets include a rotating boom for positioning a microphone or other component to be used by the person wearing the headset. Also, many types of headsets have adjustable headbands which permit the user to adjust the length of the headband to improve the fit.

For positioning booms and adjusting headbands, some types of headsets rely on frictional couplers. Some frictional couplers have positions that are controlled by plastic-on-plastic friction with or without detents. In some examples, detents can be implemented using metal or plastic springs in contact with a wave-like surface.

When headset frictional couplers are designed using metal, plastics and/or elastomers, the frictional force tends to change as the materials wear out and creep, over the life of the product. Also, these types of materials present manufacturing and production difficulties, so they are made with tolerance that leads to variation in adjustment performance even when new.

It is desirable to provide headsets having more reliable adjustment technologies.

SUMMARY

A headset including a magnetic frictional coupler is described that includes magnetic elements arranged to establish a magnetic flux that varies according to relative positions of elements of the frictional coupler. Because the magnetic elements can comprise magnets that do not change in magnetic force over time, problems arising as prior art frictional couplers wear out can be reduced or eliminated. Also, the magnetic frictional couplers for headsets described herein can be small, can operate silently and can be easily manufactured.

An embodiment is described in which the headset comprises a first member having a first engagement surface and a second member having a second engagement surface disposed for relative positioning of the first and second members along the line of adjustment. Magnetic elements are arranged on the first and second members. The magnetic elements are arranged to establish a magnetic flux between the first engagement surface and the second engagement surface, and thereby establishing a frictional force tending to hold the relative positions of the first and second members, at least in selected detent positions. The magnetic flux varies as a function of the relative positions of the first and second members along the line of adjustment, and has peaks at a plurality of detent positions along the line of adjustment. In some embodiments, the first and second members comprise a hub and a boom configured for rotational positioning around a pivot to adjust the angle of the boom. In some embodiments, the first and second members comprise elements of the headband configured for translational positioning to adjust the length of the headband.

The magnetic elements can comprise various combinations of permanent magnets, elements made of ferromagnetic materials which can be magnetized by an imposed magnetic field, thin-film magnets comprising patterned or "printed" magnetic fields, and/or other magnetic materials suitable for inducing magnetic flux. In some embodiments, one or more of the magnetic elements can be an electromagnet.

In one example, a plurality of magnets is fixed on the first member, arranged with one magnetic pole proximal to the first engagement surface and an opposite magnetic pole distal to the first engagement surface. In this configuration, the poles of the magnets proximal to the first engagement surface are disposed in a pattern corresponding to the detent positions. Also, a complementary magnetic element, or set of elements, is disposed on the second member, arranged to increase the magnetic flux when the second member is positioned at detent positions in the plurality of detent positions.

In some embodiments, the one or more magnetic elements can comprise an elongated magnetic strip disposed along the line of adjustment on the first member, and a complementary magnetic element on the second member. The elongated magnetic strip and complementary magnetic element can cooperate to establish a minimum attractive magnetic flux, and corresponding frictional force, along the line of adjustment.

Also, in some embodiments, a non-magnetic spacer can be disposed between the first and second members. The spacer can comprise a material having a selected coefficient of friction (e.g. a lower coefficient of friction) which contributes a selected amount to the frictional force. Also, the spacer can have a specified thickness which can modify the magnitude of the magnetic flux at the engagement surfaces. The spacer can be part of one of the first and second members, or a separate element as suits a particular implementation.

Other aspects and advantages of the present technology can be seen on review of the drawings, the detailed description and the claims which follow.

BRIEF DESCRIPTION OF THE DRAWINGS

FIGS. 8A, 8B illustrate a plurality of magnetic elements on a first member and complementary magnetic elements on a second member arranged to establish a magnetic flux that is a function of relative rotational position.

FIG. 9 is an alternative arrangement of magnetic elements on the second member which can be used as a complement to the configuration of FIG. 8A.

FIG. 10 is an alternative arrangement of magnetic elements, in the form of a patterned magnetic film, on one of the first and second members.

FIG. 13 is an exploded view of components of a magnetic frictional coupler like that of FIG. 11 taken from a first perspective.

FIG. 14 is an exploded view of components of the magnetic frictional coupler of FIG. 13 taken from a different perspective.

FIG. 15 illustrates an arrangement of magnetic elements for first and second members of a magnetic frictional coupler arranged for translational positioning.

FIG. 16 illustrates an arrangement of magnetic elements on the second member for the embodiment of FIG. 15.

FIG. 17 illustrates an alternative arrangement of magnetic elements for first and second members of a magnetic frictional coupler arranged for translational positioning.

FIG. 18 illustrates an arrangement of magnetic elements for the second member for the embodiment of FIG. 17.

DETAILED DESCRIPTION

A detailed description of embodiments of the technology described herein is provided with reference to the FIGS. 1-21.

Figure 1:
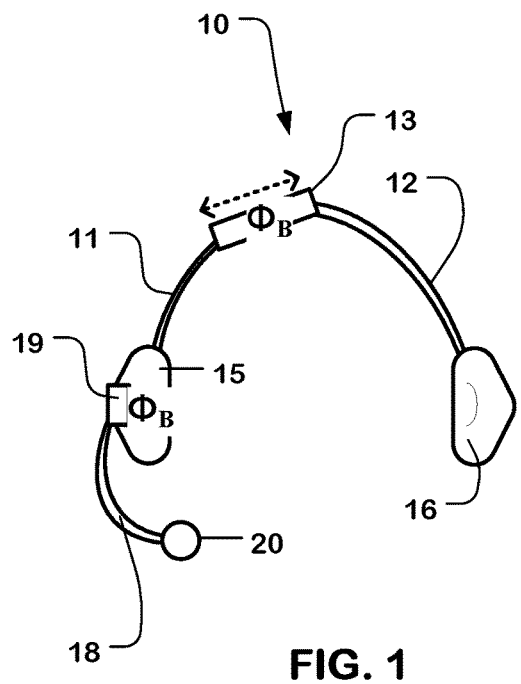
FIG. 1 is a simplified diagram of a telephone headset having magnetic frictional couplers as described herein for the microphone boom and for the adjustable headband.

FIG. 1 is a simplified illustration of a headset 10 having a headband comprising a first member 11 and a second member 12 which are connected at their proximal ends by a magnetic frictional coupler 13 for translational adjustment. Speaker housings 15 and 16 are disposed on the distal ends of the members 11 and 12, respectively. The headset 10 also has a microphone boom 18 connected at its proximal end to a magnetic frictional coupler 19 connected to the speaker housing 15 or first headband member 11, for rotational adjustment. A microphone 20 is disposed on the distal end of the microphone boom 18.

The magnetic frictional coupler 13 for headband length adjustment and the magnetic frictional coupler 19 for the microphone boom angle adjustment include means for establishing a magnetic flux (measured for example in Webers W) which is a function of relative position of the first member 11, 15 and the second member 12, 18 along a line of adjustment. Such means can be implemented using one or more magnetic elements on the first and second members, arranged in a pattern to establish variations in flux as a function of relative position, examples of which are described with reference to FIGS. 13, 15, 17 and 19. As mentioned above, the magnetic elements can comprise various combinations of permanent magnets, elements made of ferromagnetic materials which can be magnetized by an imposed magnetic field, thin-film magnets comprising patterned or "printed" magnetic fields, and/or other magnetic materials suitable for inducing magnetic flux. In some embodiments, one or more of the magnetic elements can be an electromagnet.

Peaks in the magnetic flux establish detent positions for the adjustment, having higher static frictional force that results from the peak magnetic flux. The pattern of magnetic elements on the first member and the corresponding pattern of magnetic elements on the second member cooperate to establish a complex magnetic field. The magnetic flux is the summation or integral of the field (measured for example in teslas or $W/m^2$) over the area of engagement between the first and second members, and is a measure of the normal force and corresponding frictional force at the surfaces of engagement. As the relative positions of the magnetic elements in the patterns on the first and second members change, the magnetic field changes and the magnetic flux changes. Thus, the magnetic force of attraction and corresponding frictional force between the first member 11 and the second member 12 at the magnetic frictional coupler 13 vary as the first and second members slide along the line of adjustment.

Figure 2A:
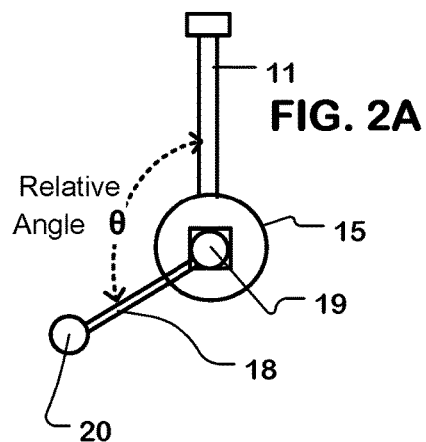
FIGS. 2A, 2B, 2C illustrate rotational adjustment of a microphone boom for the headset of FIG. 1.
Figure 2B:
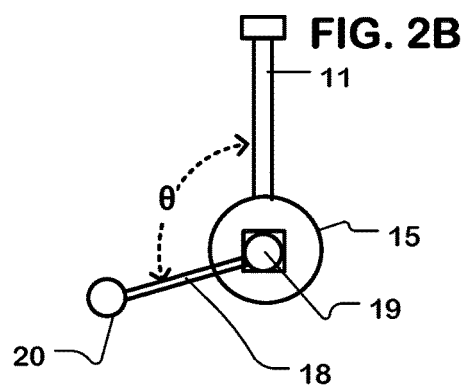
Figure 2C:
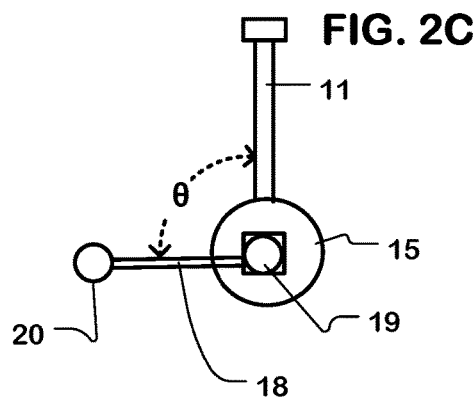

FIGS. 2A-2C are simplified side views of a headset like that of FIG. 1, showing rotation of the microphone boom 18 relative to a boom hub in the magnetic frictional coupler 19. Reference numerals used in FIGS. 2A-2C are the same as those used in FIG. 1, for like elements. FIG. 2A illustrates a relative angle θ of roughly 120° measured from the vertical line defined by the first member 11 of the headband. FIG. 2B illustrates a relative angle θ of roughly 90° measured from the vertical line defined by the first member 11 of the headband. FIG. 2C illustrates a relative angle θ of roughly 105° measured from the vertical line defined by the first member 11 of the headband. In some embodiments, the range of rotation of a microphone boom can be 360°. In other examples, the range of rotation can be limited to 270° or less.

The magnetic frictional coupler 19 includes means for establishing a magnetic flux that is a function of relative rotational position of the microphone boom 18 and the first member 11 of the headband, which can be measured as a relative angle between the microphone boom 18 and the boom hub at the magnetic frictional coupler 19. Such means can be implemented using one or more magnetic elements on the boom and the hub, arranged in a pattern to establish variations in flux as a function of relative angle θ. Examples of such means are described with reference to FIGS. 6-10. Peaks in the magnetic flux establish detent angles for the adjustment. Thus, the magnetic force of attraction and corresponding frictional force between the boom 18 and the hub at the magnetic frictional coupler 19 vary as the first and second members rotate around a circular line of adjustment.

Figure 3:
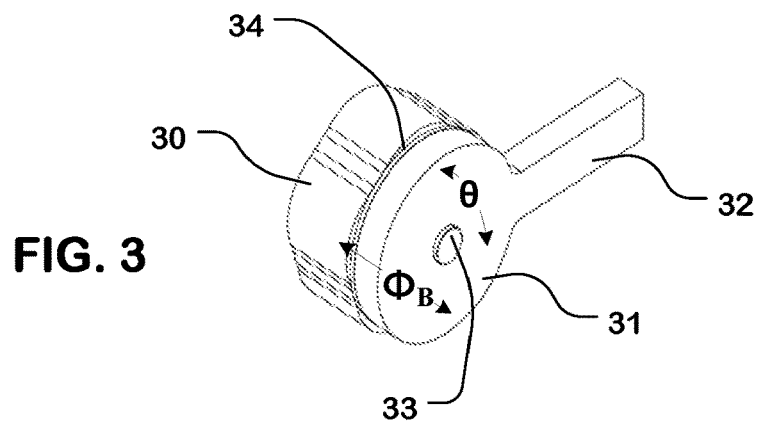
FIG. 3 illustrates a magnetic frictional coupler for a microphone boom according to an embodiment described herein.

FIG. 3 illustrates an example of a magnetic frictional coupler for a microphone boom. The coupler includes a first member comprising a boom hub 30 (which can be on or part of a speaker housing) and a second member comprising a microphone boom 32 with a bearing member 31 coupled to a pivot pin 33 on the boom hub 30. In the illustrated example, a non-magnetic spacer 34 is disposed between an engagement surface on the bearing member 31 and a corresponding engagement surface on the boom hub. As illustrated, the magnetic frictional coupler shown in FIG. 3 comprises an arrangement of magnetic elements creating a magnetic flux that changes as a function of the relative angle θ.

Figure 4:
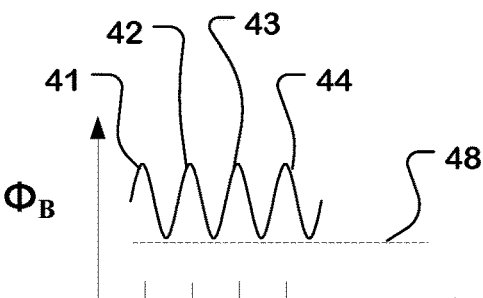
FIG. 4 is a simplified graph of magnetic flux versus relative angle for a magnetic frictional coupler like that of FIG. 3.

FIG. 4 is a graph showing variations in magnetic flux as a function of relative angle between the microphone boom 32 and the boom hub 30. In the example illustrated by FIG. 4, the magnetic flux varies as a sinusoid as the relative angle increases, so that there is a plurality of peaks 41, 42, 43, 44 . . . in the magnetic flux as the angle changes. The peaks correspond with detents in the rotational angle of the boom. The magnetic field will tend to hold the boom in a position corresponding to a peak in magnetic flux. Also illustrated in FIG. 4, there is a minimum magnetic flux 48 established by the patterns of magnetic elements across the range of motion of the coupler. The minimum magnetic flux 48 in this example is an attracting force (positive on this graph). In other embodiments, with suitable guide structures, the minimum magnetic flux can be a repelling force (negative) in one or more selected positions. This minimum magnetic flux 48 can be established by the pattern of magnetic elements to maintain a minimum force of attraction between the members of the coupler. This is a simplified example, because the magnetic flux can be a function of relative angle more complex than a simple sinusoid, depending on the pattern of magnetic elements in the magnetic frictional coupler. For example, FIG. 4 shows peaks and valleys in the magnetic flux of uniform magnitude. In some embodiments, there are peaks and valleys of varying magnitude disposed along the line of adjustment.

Figure 5:
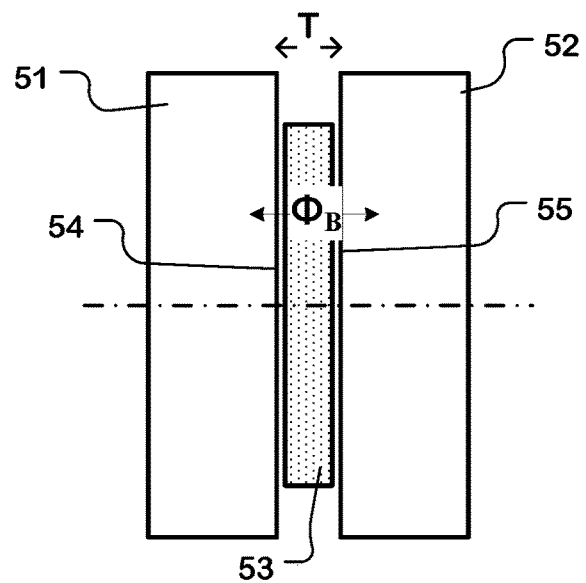
FIG. 5 illustrates a non-magnetic spacer between first and second members of a magnetic frictional coupler.

FIG. 5 is a simplified illustration of a magnetic frictional coupler having a non-magnetic spacer disposed between the members of the coupler. In this example, the coupler includes a first member 51, such as a boom hub like that of FIG. 3, and a second member 52, such as a bearing member of a microphone boom like that of FIG. 3. A non-magnetic spacer 53 is disposed between the first member 51 and the second member 52. The non-magnetic spacer 53 has a thickness T which separates the magnetic elements on the first and second members, thereby limiting the intensity of the magnetic fields between particular magnetic elements on the members. By specifying the thickness T, the intensity of the magnetic field can be designed so that the magnetic flux and frictional force induced fall within acceptable ranges for ease-of-use by the consumer, while maintaining strong detents. Also, the non-magnetic spacer 53 can comprise a material having a specified coefficient of friction, such as a low friction material, or other materials that are chosen for the purpose of establishing preferred ranges of frictional force in the magnetic frictional coupler on the engagement surfaces 54, 55 of the first member 51 and the second member 52. Examples of materials that can be utilized include Delrin, nylon, Teflon coated materials, and so on.

In the illustrated embodiment, the spacer 53 comprises a separate component disposed between the first and second members having interfaces at which the engagement surfaces are slidably engaged on at least one side of the spacer. In other embodiments, the spacer 53 can be incorporated in the body of, or fused with, one of the first and second members. It is preferred that the material of the spacer be different than the material on the engagement surface or surfaces against which it is slidably engaged.

In the example shown, the engagement surfaces are flat to support smooth sliding as the members of the magnetic frictional coupler are adjusted in position. In other embodiments, the engagement surface on one or both of the members can have one or more features such as bumps or waves to support formation of detents.

Figure 6:
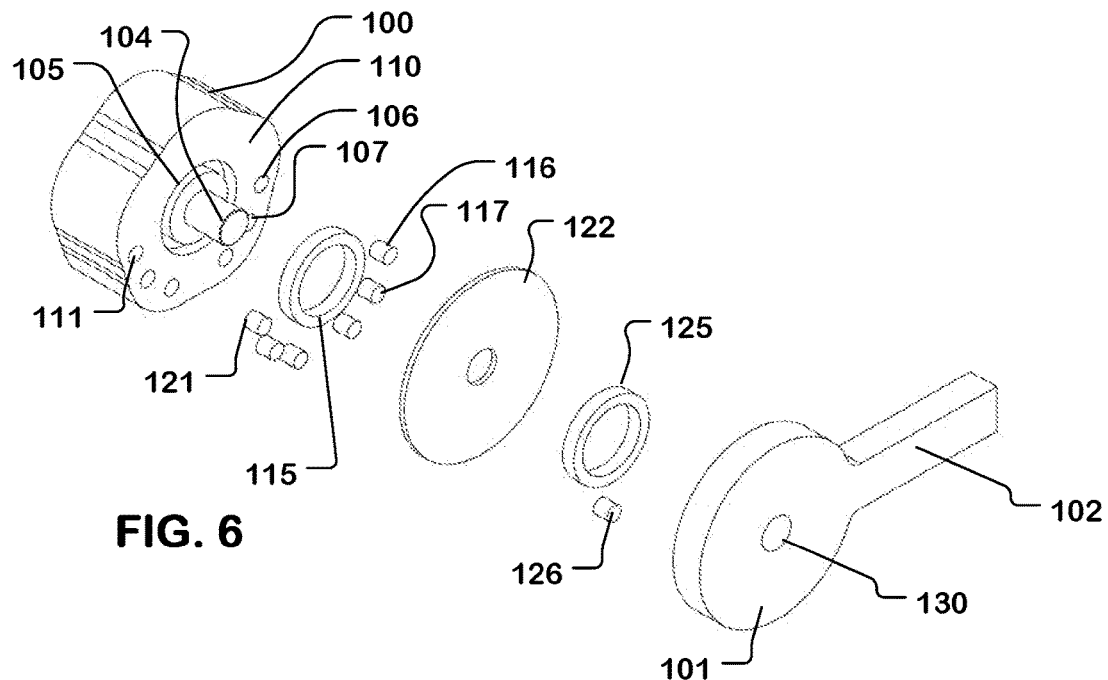
FIG. 6 is an exploded view of components of a magnetic frictional coupler like that of FIG. 3 taken from a first perspective.
Figure 7:
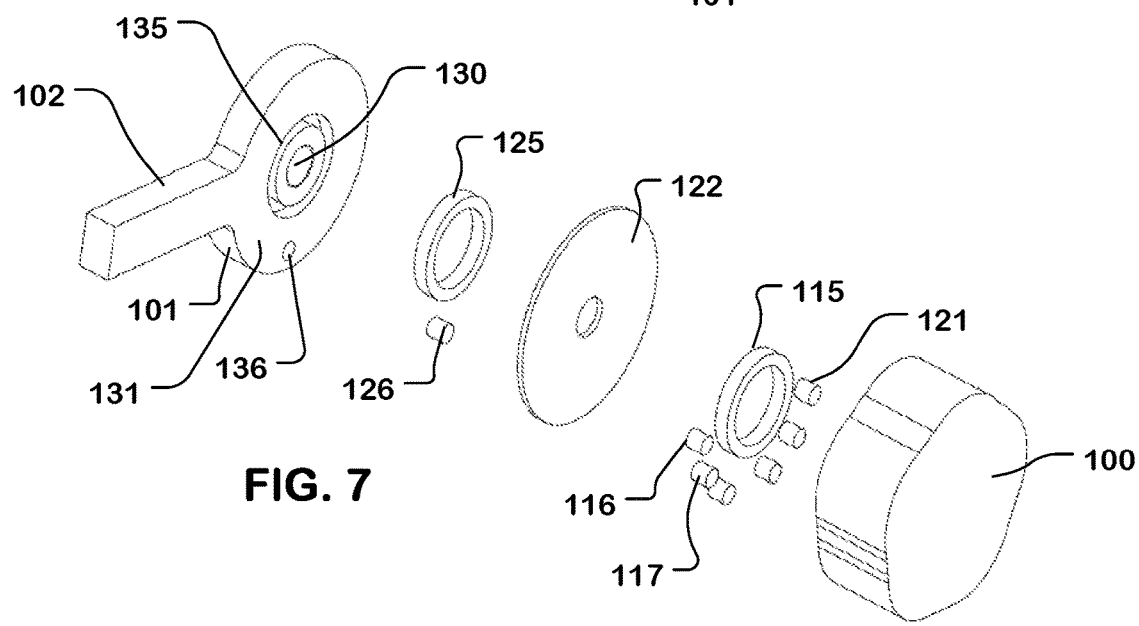
FIG. 7 is an exploded view of components of the magnetic frictional coupler of FIG. 6 taken from a different perspective.

FIGS. 6 and 7 illustrate an exploded view of components of a magnetic frictional coupler like that shown in FIG. 3, from opposing perspectives. The elements shown can be made of a variety of plastics and other suitable structural materials, such as aluminum, and by combinations of such materials, by injection molding, machining and other techniques. With reference to FIG. 6, a boom hub 100 is coupled to a boom 102 having a bearing member 101 by the magnetic frictional coupler. The engagement surface of the boom is on an opposite surface of the bearing member hidden from view in this perspective (see surface 131 in FIG. 7). The boom hub 100 includes a pivot pin 104 protruding on an axis of the hub 100. A circular recess 105 in an engagement surface 110 of the hub is disposed around the pin 104, and shaped to receive a corresponding arcuate magnetic element 115, which in this embodiment is a closed ring-shaped element. Also, the pattern of holes 106, 107, . . . 111 is arrayed on the surface 110 with spaces therebetween outside the circular recess 105. The holes 106, 107, . . . 111 are shaped to receive corresponding magnetic elements which can comprise bar magnets 116, 117, . . . 121. When the bar magnets 116, 117, . . . 121 are positioned in the holes 106, 107, . . . 111, one pole of each bar magnet is disposed proximal the engagement surface 110, and an opposite pole of each bar magnet is disposed distal from the engagement surface 110, recessed within the body of the hub 100. In one example, the same pole, such as the north pole, is disposed proximal to the engagement surface 110 for every magnet 116, 117, . . . 121 in the pattern. In an alternative, the poles can be arranged alternately with some south poles proximal to the engagement surface and some north poles proximal to the engagement surface.

The exposed ends of the magnetic elements can be flush with the surface 110, or recessed relative to the surface, or protrude from the surface as suits a particular implementation. Also, a protective layer or spacer layer can be formed over the magnetic elements.

The combination of the arcuate magnetic element 115 and the bar magnets 116, 117, . . . 121, comprise a pattern of magnetic elements on the hub 100, corresponding to a first member of the magnetic frictional coupler.

Also shown in FIG. 6 is a non-magnetic spacer 122 such as described with reference to FIG. 5 having a hole in the center to receive the pivot pin 104.

FIG. 6 illustrates a ring-shaped magnet 125, and a bar magnet 126 to be disposed in an engagement surface of the bearing member 101 on the microphone boom 102. These magnets establish a pattern of magnetic elements on the bearing member 101.

FIG. 6 illustrates the bearing member 101 of the boom 102, with a hole in the center designed to receive the pin 104.

FIG. 7 shows the frictional magnetic coupler in an exploded view from an opposing perspective, in which the engagement surface 131 of the bearing member 101 on the boom 102 is shown. As illustrated, a circular recess 135 is disposed on the engagement surface 131 around a hole 130 that is designed to receive the pivot pin 104. The circular recess 135 is configured to receive a corresponding ring-shaped magnet 125. Also, a hole 136 is disposed in the engagement surface 131, designed to receive a bar magnet 126. The bar magnet 126 can be disposed so that one of the poles is proximal to the engagement surface 131, and the opposing pole is distal to, and recessed in the body of the bearing member 101, relative to the engagement surface 131. Thus, the arcuate magnet, and the bar magnet are elements in a plurality of magnetic elements arranged in a pattern on the bearing member 101.

The exposed ends of the magnetic elements can be flush with the surface 131, or recessed relative to the surface, or protrude from the surface, as suits a particular implementation. A protective layer can be disposed over the magnetic elements.

The non-magnetic spacer 122 overlies the engagement surface 131, and the pattern of magnetic elements on the bearing member 101 of the boom 102. The pattern of magnetic elements 115-121 which are disposed in the hub 100 as discussed above are also illustrated in FIG. 7.

The patterns of magnetic elements used to establish magnetic flux as a function of rotational angle can be configured as suits a particular implementation, and the type and locations of detents desired. FIG. 8A and FIG. 8B illustrate an alternative pattern of magnetic elements on a first member 200 and a second member 250. In the pattern of FIG. 8A, magnetic elements 210-217 are arranged around the circumference of first circular member 200 with equal spacing, with a gap (in an arc from about 350 degrees to about 10 degrees for example) in the spacing between the first magnetic element 210 and the last magnetic element 217. A ring-shaped magnet 205 (or other arcuate magnet) is disposed inside the magnetic elements 210-217. In other embodiments, the ring-shaped magnet or other arcuate magnet can be placed outside the pattern of magnetic elements 210-217. A hole 201 for accepting a pivot pin is shown. A complementary pattern on member 250 is shown in FIG. 8B. The complementary pattern includes a ring-shaped magnet 255 which is similar to the ring-shaped magnet 205 on the first member. Ring-shaped magnet 255 can be configured so that the pole proximal to the engagement surface on member 250 is the opposite pole relative to that of the magnet 205 proximal to the engagement surface on the member 200. Also, it can be configured so that the ring-shaped magnet 255 is replaced by a magnetic element in the form of a ferromagnetic ring, which is not a permanent magnet. The complementary pattern shown in FIG. 8B also includes a single magnet 260 arranged in a position on member 250 to overlie a corresponding magnet in the array of magnetic elements 210-217 on the member 200. A hole 251 for accepting a pivot pin is shown. Thus, the magnetic flux is a function of the position of the magnet 260 on member 250 relative to the positions of the magnetic elements 210-217. As the member 250 is rotated relative to the member 200, the magnetic flux will change as a function of the changes in these relative positions.

FIG. 9 illustrates (in a reduced scale) an alternative pattern of magnetic elements on a member complementary to the member shown in FIG. 8A. In FIG. 9, the pattern comprises a single magnetic element 280 in a position on member 270 arranged to overlie a corresponding magnet in the array of magnetic elements 210-217 on the member 200. A hole 271 for accepting a pivot pin is shown. The magnetic element 280 can be larger than the magnet 260 in the embodiment of FIG. 8B in order to interact more strongly with the ring-shaped magnet 205 on the member shown in FIG. 8A. The embodiment of FIG. 9 omits the ring-shaped magnet 255 shown in the embodiment of FIG. 8B, and can be utilized as long as the minimum magnetic force achieved is sufficient for the purposes of the implementation.

As mentioned above, the magnetic elements can comprise permanent magnets, ferromagnetic materials, thin-film magnets comprising patterned or "printed" magnetic fields, or other magnetic materials suitable for inducing magnetic flux. In some embodiments, one or more of the magnetic elements can be an electromagnet.

FIG. 10 illustrates an embodiment using a patterned thin-film magnet disposed on a member 300 of a magnetic frictional coupling. In the illustrated example, the pattern comprises a ring-shaped element 302 with cog-shaped elements 310, 311, . . . 315 arrayed around the ring-shaped element 302. A hole 301 for accepting a pivot pin is shown. The pattern shown in FIG. 10 can be used in conjunction with a pattern like that of FIG. 8B, a pattern like that of FIG. 9, or other patterns as suits a particular implementation. Also, a complementary magnet can be formed using a thin-film magnet configured to interact with the cog-shaped elements to establish magnetic flux. A thin-film magnet can be patterned with both north pole regions and south pole regions proximal to the engagement surface of the member. See for examples of patterned thin-film magnets, Fullerton et al., U.S. Pat. No. 8,179,219 entitled FIELD EMISSION SYSTEM AND METHOD, issued May 15, 2012, which is incorporated by reference as if fully set forth herein.

Figure 11:
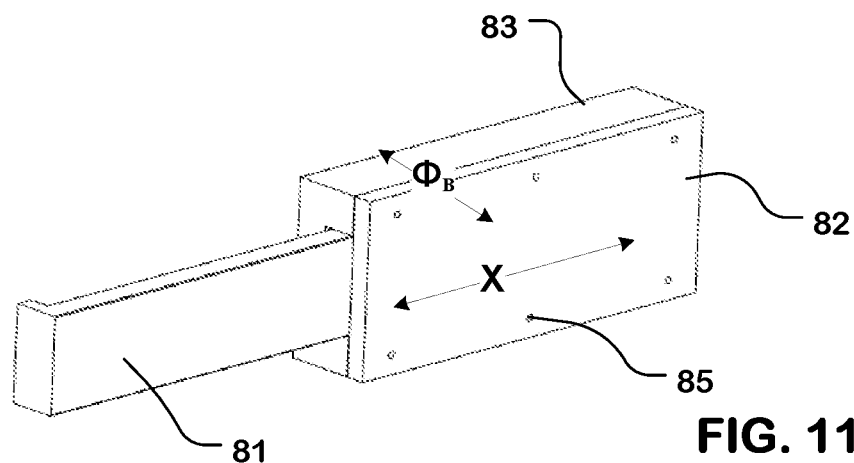
FIG. 11 illustrates a magnetic frictional coupler for an adjustable headband according to an embodiment described herein.

FIG. 11 illustrates an example of a magnetic frictional coupler for translational adjustment of a headset headband. The coupler includes a first member 83 and a second member 81 disposed for translational movement along the axis X. The first member 83 can be coupled to a first member of a headset headband, and the second member 81 can be coupled to a second member of the headset headband. As the coupler is adjusted, the length of the headband is adjusted. The first member 83 incorporates a rail or guide to confine motion of the second member 81 along the line of adjustment. A cover 82 overlies the first member 83, and secures the second member 81 to the rail or guide. Fasteners 85 can be used to fix the cover 82 to the assembly. As illustrated, the magnetic frictional coupler shown in FIG. 11 comprises an arrangement of magnetic elements creating a magnetic flux that changes as a function of the relative position along the axis X.

Figure 12:
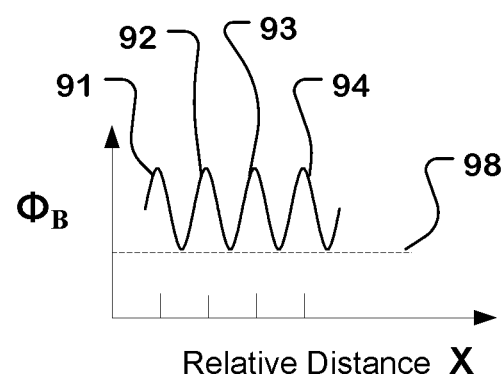
FIG. 12 is a simplified graph of magnetic flux versus relative translational distance for a magnetic frictional coupler like that of FIG. 11.

FIG. 12 is a graph showing variations in magnetic flux as a function of relative position (distance between reference locations on the members) along the axis X. In the example illustrated by FIG. 12, the magnetic flux varies as a sinusoid as the relative distance of overlap between the members changes, so that there is a plurality of peaks 91-94 in the magnetic flux as the distance changes. The peaks correspond with detents in the translational position of the coupler. The magnetic field will tend to draw the position of the members of the coupler to a position at a peak in magnetic flux. Also illustrated in FIG. 12, there is a minimum magnetic flux 98 established by the patterns of magnetic elements across the range of motion of the coupler. This minimum magnetic flux 98 can be established by the pattern of magnetic elements as discussed herein, to maintain a minimum force of attraction between the members of the coupler. As with FIG. 4, this is a simplified example, because the magnetic flux can be a function of the relative distance that is more complex than a simple sinusoid, depending on the pattern of magnetic elements in the magnetic frictional coupler. For example, peaks and valleys of the magnetic flux can vary in magnitude along the line of adjustment.

FIGS. 13 and 14 illustrate an exploded view of a magnetic frictional coupler like that shown in FIG. 11, from opposing perspectives. FIG. 13 shows a first member 83 that is coupled to a second member 81 by the magnetic frictional coupler. In this example, the first and second members are straight. In other embodiments, the first and second members are bowed in a manner that facilitates fitting on a user's head. The first member 83 includes a guide formed by protruding rails (e.g. 401) along the sides of the member 83 configured to receive the second member 81 in a sliding relationship. A cover 82 is configured to connect to the member 83, and secure the second member 81 on the guide.

An elongated recess 408 is disposed on an engagement surface 409 of the member 83, and shaped to receive a corresponding elongated magnetic element 418. Also, a pattern of holes (e.g. 402) in the engagement surface 409 with spaces therebetween is arrayed along the elongated recess 408, and shaped to receive corresponding magnetic elements 411, 412, . . . 415. The magnetic elements 411, 412, . . . 415 can comprise bar magnets which can be positioned in the holes (e.g. 402) so that one pole of each bar magnet is disposed proximal to the engagement surface 409 of the member 83, and an opposite pole of each bar magnet is disposed distal from the engagement surface 409, recessed within the body of the member 83. In one example, the same pole, such as the north pole, is disposed proximal to the engagement surface 409 for every magnet used as a magnetic element 411, 412, 415. In an alternative, the poles can be arranged alternately with some south poles proximal to the engagement surface 409 and some north poles proximal to the engagement surface 409.

The exposed ends of the magnetic elements can be flush with the engagement surface 409, or recessed relative to the surface, or protrude from the surface as suits a particular implementation. A protective cover can be formed over the magnets.

The combination of the elongated magnetic element 418 and the bar magnets used as the magnetic elements 411-415, comprise a pattern of magnetic elements on the first member 83 of the magnetic frictional coupler.

Also shown in FIG. 13 is a non-magnetic spacer 420, such as that described above with reference to FIG. 5.

FIG. 13 illustrates an elongated magnet 435, and a bar magnet 431, which are arranged as magnetic elements on an engagement surface of the second member 81. The elongated magnet 435 can be substantially longer than the elongated magnetic element 418 on the first member 83, to allow for a long range of motion for the second member 81 relative to the first member 83.

FIG. 14 shows the frictional magnetic coupler of FIG. 13 in an exploded view from an opposing perspective, in which the engagement surface 442 of the second member 81 on the magnetic frictional coupler is shown. The second member 81 includes a recess 445 in the engagement surface 442 configured to receive the elongated magnet 435. Also, the second member 81 includes a recess 441 in the engagement surface 442 configured to receive the bar magnet 431. Thus, the elongated magnet 435 and the bar magnet 431 are arranged in a pattern on the second member, which cooperates with the pattern of magnetic elements on the first member to establish a magnetic flux that is a function of the translational position of the first and second members.

The patterns of magnetic elements used to establish magnetic flux as a function of translational position in the magnetic frictional coupler described herein can be configured as suits a particular implementation, and the type and locations of the detents desired. FIG. 15 and FIG. 16 illustrate an alternative pattern of magnetic elements on a first member 501 and a second member 502. In the pattern of FIG. 15, bar or spot magnetic elements 520-525 are arranged in a row along one side of the first member 501 along a line of adjustment. An elongated magnet 510 is disposed parallel to the row of bar or spot magnetic elements 520-525. Magnetic elements 540 and 541 are disposed on the second member 502 in locations designed to cooperate with the row of magnetic elements 520-525 on the first member 501. Likewise, an elongated magnet 530 is disposed on the second member 502 parallel with the line of adjustment, so that it overlaps with the elongated magnet 510 on the first member 501, as the members are moved along the line of adjustment. In the illustration of FIG. 15, the first and second members 501, 502 are positioned so that magnetic elements 540 and 541 on the second member 502 overlap with the magnetic elements 524 and 525 in the row of magnetic elements on the first member 501. Thus, the relative positioning shown in FIG. 15 can correspond to a peak in magnetic flux, and a detent in the translational motion of the members. FIG. 16 illustrates the second member 502 of FIG. 15, without the overlay of the first member. The same reference numbers are used, and are not described again.

FIGS. 17 and 18 illustrate another alternative pattern of magnetic elements on a first member 601 and a second member 602, which can be used in a magnetic frictional coupler for translational motion as described herein. In the pattern of FIG. 17, a row of elongated magnetic elements 620-625 is disposed on the first member 601. The magnetic elements 620-625 are disposed so that their long axes are orthogonal to the line of adjustment, and so that there are spaces between the magnetic elements. On the second member 602, a first elongated element 640 and a second elongated element 641 are disposed in a manner to cooperate with the magnetic elements 620-625 on the first member 601 to establish a magnetic flux that varies as a function of relative position of the members. The complementary pattern on the second member 602 shown in FIG. 17 includes two elongated magnets orthogonal to the line of adjustment configured for cooperation with corresponding magnets on the first member 601. The elongated magnets 530, 550 which are disposed parallel with the line of adjustment in the example of FIGS. 15 and 16 are omitted in this example.

As illustrated in FIG. 17, the first and second members are positioned so that the magnetic elements 640, 641 on the second member 602 overlap with the magnetic element 624, 625 on the first member 601. Thus, a peak in the magnetic flux can be formed by this positioning of the patterns of magnetic elements, establishing a detent in the magnetic frictional coupling.

FIG. 18 illustrates the second member 602 of FIG. 17, without the overlay of the first member. The same reference numbers are used, and not described again.

Figure 19:
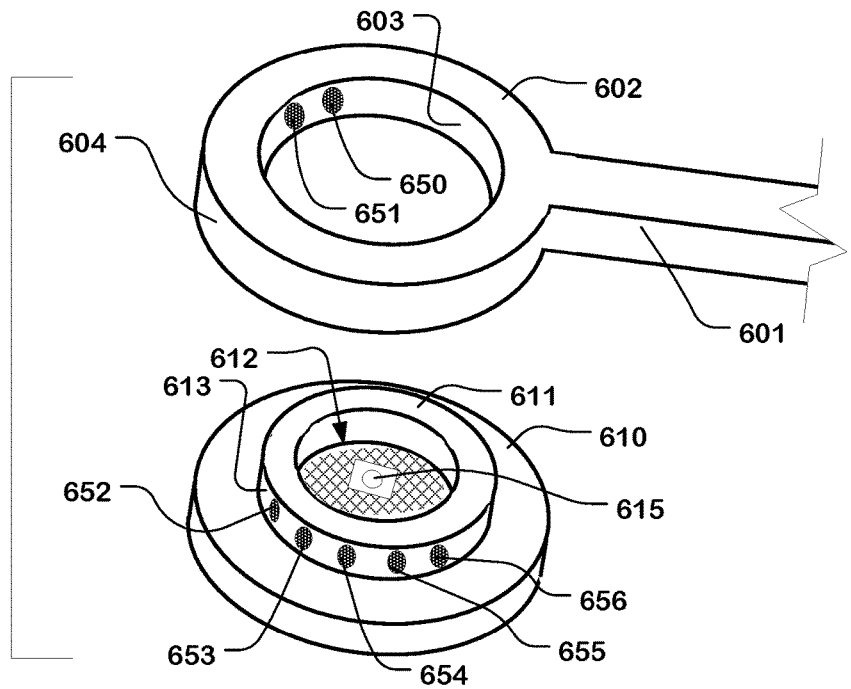
FIG. 19 illustrates an alternative implementation of a boom hub and boom with a magnetic frictional coupler.
Figure 20:
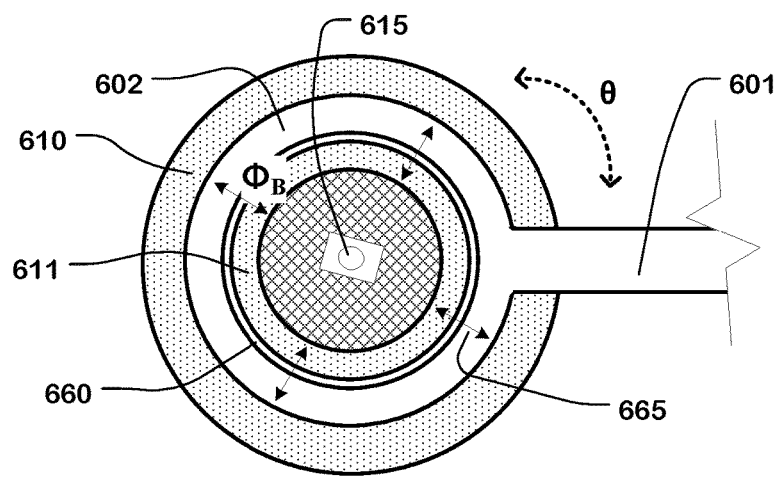
FIG. 20 is an aerial view of the boom hub and boom of FIG. 19.

FIGS. 19 and 20 illustrate another example of a magnetic frictional coupler for a microphone boom. The coupler includes a first member comprising a boom hub 610 and a second member comprising a microphone boom 601. The microphone boom 601 includes a bearing member 602. The boom hub 610 has a protruding structure 611, having a cylindrical outside surface 613. In this embodiment, the protruding structure 611 includes an opening 612. The opening 612 can also be cylindrical as shown in this illustration.

The bearing member 602 on the microphone boom 601 includes an opening having a cylindrical inside surface 603. Also, the outside surface 604 of the bearing member 602 can be cylindrical as shown in the illustration.

Of course, in other embodiments, the opening 612 in the protruding structure 611 and the outside surface 604 of the bearing member 602 (as well as other elements of the frictional coupler) can have other shapes as suits the needs of a particular implementation and for ornamental reasons.

In the embodiment shown in FIG. 19, the opening 612 in the protruding structure 611 provides space for an electronic component 615. The space may allow for mounting of the electronic component 615 on a surface of the boom hub 610, or otherwise inside or accessible through the opening in the protruding structure 611. In one embodiment, the boom hub 610 is disposed on a speaker housing for a headset. The speaker housing is configured to be placed over the user's ear. The electronic component 615 can comprise a pushbutton, or other electronic switch, which is disposed ergonomically centered on the speaker housing so that when depressed or otherwise operated, the speaker housing is not displaced from its position over the ear.

In the example shown in FIG. 19, the first engagement surface of the frictional coupler is on the cylindrical outside surface 613 of the protruding structure 611. The second engagement surface of the frictional coupler is on the cylindrical inside surface 603 of the bearing member 602. Although not shown in the figure, there may be additional guide elements on the boom hub 610 and the bearing member 602 to hold the components together during rotational movement, such as a lip on the protruding member, or the like.

A pattern of magnetic elements is disposed on the cylindrical inside surface 603 of the bearing member 602, including magnetic elements 650 and 651. Likewise, a pattern of magnetic elements is disposed on the cylindrical outside surface 613 of the protruding structure 611 including magnetic elements 652-656 in the drawing. Thus, the frictional coupler illustrated in FIGS. 19 and 20 comprises an arrangement of magnetic elements creating a magnetic flux that changes as a function of the relative angle between the microphone boom 601 and the boom hub 610. The illustrated arrangement of magnetic elements is one example. In other examples, the continuous magnetic strip can be disposed around one or both of the engagement surfaces. Also, printed magnetic fields can be implemented on one or both of the engagement surfaces to create a variety of effects on magnetic flux as a function of the relative angle. As mentioned above, the magnetic elements can comprise permanent magnets, ferromagnetic materials, thin-film magnets comprising patterned or "printed" magnetic fields, or other magnetic materials suitable for inducing magnetic flux. In some embodiments, one or more of the magnetic elements can be an electromagnet.

FIG. 20 is an aerial view of a magnetic frictional coupler like that of FIG. 19, including a boom 601 having a bearing member 602, and a hub 610 having a protruding structure 611. The cylindrical outside surface of the protruding structure 611 and the cylindrical inside surface of the bearing member 602 are concentrically mounted in a manner that allows for rotation around the axis of the concentric cylindrical surfaces (603 and 613 shown in FIG. 19). The arrangement of magnetic elements creates a magnetic flux that includes a component (vector) orthogonal to the axis of rotation of the boom 601. The magnetic flux can have components that are radially arranged, as illustrated by the field vector arrows (e.g. 665). As discussed above, the magnetic elements on the protruding structure 611 can be configured so that they have a north pole proximal to the first engagement surface, while the magnetic elements on the bearing member 602 can be configured so that they have a south pole proximate to the second engagement surface, creating regions of strong magnetic attraction when the magnetic elements of opposite poles are aligned. Alternatively, some magnetic elements on the first and second engagement surfaces can be configured to have an opposite pole proximal to the surfaces. Also, there can be a variety of arrangements including both north and south pole regions on one or both of the first and second engagement surfaces.

The magnetic frictional coupler magnetically couples the boom 601 and the hub 610, by a magnetic field in the region 660 between the engagement surfaces of the bearing member 602 and the protruding structure 611, with a corresponding normal force and friction. In some embodiments, a non-magnetic spacer can be disposed in the region 660. In some embodiments, roller bearings or other mechanical structures for controlling friction between the engagement surfaces can be included.

In some embodiments, the magnetic flux can comprise a repelling force at some relative angles of rotation, and an attracting force at other relative angles of rotation. The arrangement of magnetic elements can be configured to induce repelling force in a radially symmetric pattern in some embodiments, at some relative angles. This arrangement can be an arc, or a set of arcs, in which there is low friction in the coupling between the members, disposed among detents of relatively high friction in the coupling between the members.

Figure 21:
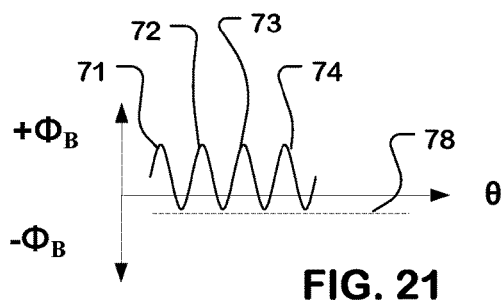
FIG. 21 is a simplified graph of magnetic flux versus relative angle for a magnetic frictional coupler like that of FIG. 20.

FIG. 21 is a graph showing variations in magnetic flux as a function of relative angle between the microphone boom 601 and the boom hub 610. In the example illustrated by FIG. 21, the magnetic flux varies as a sinusoid as a relative angle increases, so that there is a plurality of peaks 71, 72, 73, 74 . . . in attractive magnetic flux (positive in the figure) as the angle changes. These peaks correspond with detents in the rotational angle of the boom. The magnetic field as illustrated in FIG. 21 includes regions of repelling magnetic flux magnitude at minima at the level 78 in the sinusoid (negative in the figure). As discussed above the magnetic flux can be a function of relative angle that is more complex than the simple sinusoid illustrated.

A magnetic frictional coupler technology has been described for use in headsets for the adjustment of the angle of rotation of a microphone boom or similar boom, and for changing the length of the headband for adjustment of the fit of the headset. The use of patterns of magnetic elements allows for the creation of a baseline magnetic and frictional force as well as detents established by peaks in magnetic and frictional force along the line of adjustment.

A magnetic frictional coupler as described herein can include a fixed member and a sliding member (which can slide in a longitudinal or rotating manner) having patterns of magnetic elements or printed magnetic fields disposed thereon.

Magnetic elements can be utilized for which the magnetism does not vary over time. Thus, the magnetic flux and frictional force induced by the patterns of the magnetic element will not wear out, allowing for the headband friction and detents to be maintained and remain constant over the life of the product. Also, the magnetic frictional couplers can be manufactured using a smaller number of parts, and without mechanical springs.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A headset comprising:
a first member having a first flat engagement surface;
a second member having a second flat engagement surface, the second flat engagement surface disposed for rotational movement relative to the first flat engagement surface along a line of adjustment;
a pivot pin and bearing member coupled to the first and second members and orthogonal to the first and second flat engagement surfaces, and wherein the line of adjustment comprises an arc around the pivot pin;
a first plurality of magnetic elements on the first member, and arranged with a magnetic pole proximal to the first engagement surface and an opposite magnetic pole distal from the first engagement surface, and wherein the poles of the magnetic elements proximal to the first engagement surface are disposed in a first pattern corresponding to detent positions in a plurality of detent positions along the line of adjustment; and
a second plurality of magnetic elements on the second member including an arcuate magnetic element around the pivot pin, and a bar magnetic element disposed at an angular position around the pivot pin, and arranged with respective magnetic poles proximal to the second engagement surface and opposite magnetic poles distal from the second engagement surface, and wherein the poles of the second plurality of magnetic elements proximal to the second engagement surface are disposed in a second pattern to maintain the second member at one of the plurality of detent positions of the first pattern;
the first plurality of magnet elements and the second plurality of magnetic elements arranged to establish a magnetic flux between the first flat engagement surface and the second flat engagement surface, the magnetic flux varying as a function of relative position of the first and second members along the line of adjustment, and having peaks at the plurality of detent positions along the line of adjustment.

2. The headset of claim 1, comprising a guide coupled to the first and second members, and the line of adjustment comprises an arc along the guide.

3. The headset of claim 1, further including an elongated magnetic strip disposed along the line of adjustment on the first member.

4. The headset of claim 1, including a non-magnetic spacer disposed between, and in frictional contact with, the first and second flat engagement surfaces.

5. The headset of claim 1, wherein the first plurality of magnetic elements comprises a patterned magnetic film fixed on the first member having north and south poles in a pattern proximal to the first engagement surface.

6. The headset of claim 1, wherein the magnetic flux is an attracting force in some relative positions of the first and second members and a repelling force in at least one other relative position.

7. A headset comprising:
a first member having a first engagement surface;
a second member having a second engagement surface, the second engagement surface disposed for movement relative to the first engagement surface along a line of adjustment;
a first plurality of magnetic elements on the first member, and arranged with a magnetic pole proximal to the first engagement surface and an opposite magnetic pole distal from the first engagement surface, and wherein the poles of the magnetic elements proximal to the first engagement surface are disposed in a first pattern corresponding to detent positions in a plurality of detent positions along the line of adjustment; and
a second plurality of magnetic elements on the second member including an elongated magnetic element disposed along the line of adjustment, and a bar magnetic element disposed at a longitudinal position along the line of adjustment, and arranged with respective magnetic poles proximal to the second engagement surface and opposite magnetic poles distal from the second engagement surface, and wherein the poles of the second plurality of magnetic elements proximal to the second engagement surface are disposed in a second pattern to maintain the second member at one of the plurality of detent positions of the first pattern; and
a non-magnetic spacer disposed between for frictional contact with the first and second engagement surfaces, the non-magnetic spacer comprising a low friction material;
the first plurality of magnetic elements and the second plurality of magnetic elements arranged to establish a magnetic flux between the first engagement surface and the second engagement surface, the magnetic flux varying as a function of relative position of the first and second members along the line of adjustment, and having peaks at the plurality of detent positions along the line of adjustment.

8. The headset of claim 7, comprising a pivot coupled to the first and second members, and the line of adjustment comprises an arc around the pivot.

9. The headset of claim 7, comprising a guide coupled to the first and second members, and the line of adjustment comprises a line along the guide.

10. The headset of claim 7, wherein one or more of the first plurality of magnetic elements comprise an elongated magnetic strip disposed along the line of adjustment on the first member.

11. The headset of claim 7, wherein one or more of the first plurality of magnetic elements comprise a patterned magnetic film fixed on the first member having north and south poles in a pattern proximal to the first engagement surface.

12. The headset of claim 7, wherein the magnetic flux is an attracting force in some relative positions of the first and second members and a repelling force in at least one other relative position.

13. A headset, comprising:
a headband;
a boom hub coupled to the headband having a first engagement surface;
a boom having a second engagement surface, the second engagement surface disposed for rotation relative to the first engagement surface of the boom hub;
a non-magnetic spacer disposed between for frictional contact with the first and second engagement surfaces, the non-magnetic spacer comprising a low friction material;
a first plurality of magnetic elements on the boom hub, and arranged with a magnetic pole proximal to the first engagement surface and an opposite magnetic pole distal from the first engagement surface, and wherein the poles of the magnetic elements proximal to the first engagement surface are disposed in a first pattern corresponding to detent positions in a plurality of detent positions along a line of adjustment; and
a second plurality of magnetic elements on the boom including an elongated magnetic element disposed along the line of adjustment, and a bar magnetic element disposed at an angular position along the line of adjustment, and arranged with respective magnetic poles proximal to the second engagement surface and opposite magnetic poles distal from the second engagement surface, and wherein the poles of the second plurality of magnetic elements proximal to the second engagement surface are disposed in a second pattern to maintain the boom at one of the plurality of detent positions of the first pattern;

the first plurality of magnetic elements and the second plurality of magnetic elements arranged to establish a magnetic flux attracting the first engagement surface to the second engagement surface, the magnetic flux varying as a function of relative angle of rotation between the first and second engagement surfaces, and having peaks at a plurality of detent angles.

14. The headset of claim 13, wherein one or more of the magnetic elements in the first plurality of magnetic elements comprise a patterned magnetic film fixed on the boom hub.

15. The headset of claim 13, wherein the boom hub comprises a base, and a protruding structure on the base having a cylindrical outside surface, wherein the first engagement surface is on the cylindrical outside surface; and the boom comprises an opening having a cylindrical inside surface, and wherein the second engagement surface is on the cylindrical inside surface.

16. The headset of claim 13, wherein the magnetic flux is an attracting force in some relative positions of the boom hub and the boom and a repelling force in at least one other relative position.

17. The headset of claim 13, comprising a pivot coupled to the boom and the boom hub, and the first and second engagement surfaces are smooth and flat, and disposed in planes normal to the pivot.

* * * * *